United States Patent Office 2,746,810
Patented May 22, 1956

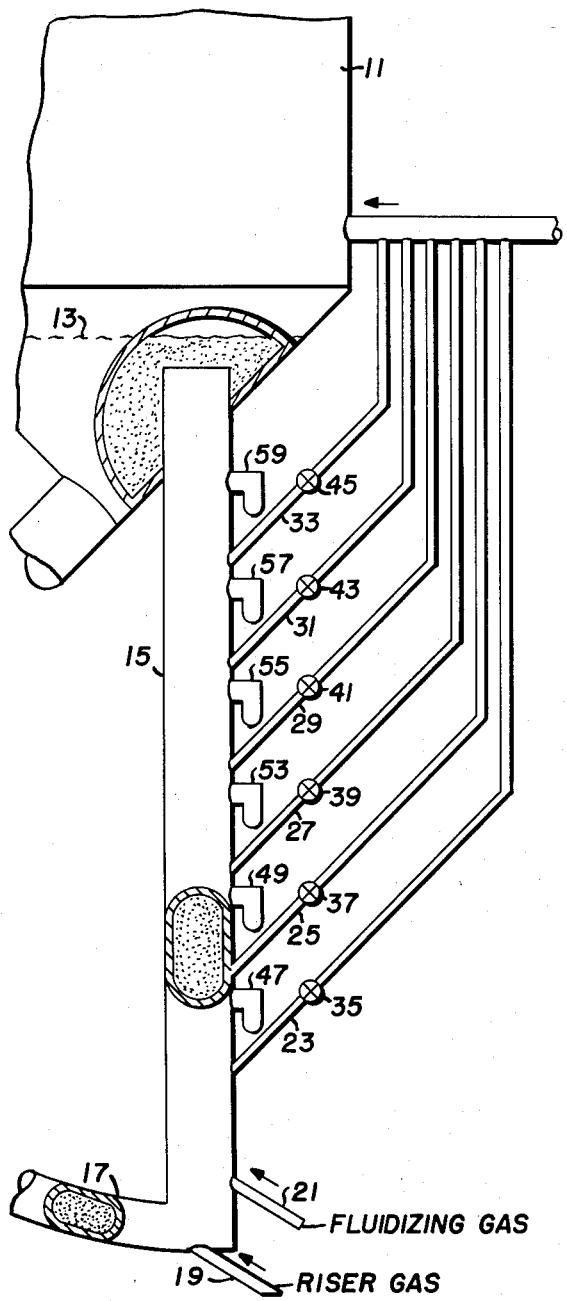

2,746,810

STANDPIPE FOR COARSE SOLIDS AND METHOD OF OPERATING

Walter G. May, Union, N. J., and George L. Matheson, deceased, late of Summit, N. J., by The Summit Trust Company, executor, Summit, N. J., assignors to Esso Research and Engineering Company, a corporation of Delaware Application May 7, 1953, Serial No. 353,618

6 Claims. (Cl. 302—52)

The present invention relates to an improved standpipe system for controlling flow of coarse solids and a method of operating said system. The invention pertains particularly to systems wherein solid particles of matter of somewhat coarser sizes than are customarily fluidized are controlled for optimum operation.

In the prior art numerous systems have been used in the petroleum refining field and in other chemical and analogous operations wherein solid particles are to be contacted with gases or vapors. A highly successful process which is widely used, particularly in the petroleum refining industry, involves the use of relatively large masses of finely divided solid particles, particularly catalysts. These are employed in the form of moving or fluid beds which are used to contact hydrocarbon gases and vapors to catalyze cracking, conversion, and various types of reactions. In such processes it is common to establish fluistatic heads of so-called fluidized solids, analogous to hydraulic heads of liquids. These are set up by establishing an upward flow of a gasiform fluid which may be either vapor or gas, hereafter referred to simply as gas, through a mass of particles at such velocities and under such conditions as to cause the particles to fluidize, i. e. to become turbulent and to resemble a boiling liquid. Such a fluidized mass has a definite pressure head and it has fluid flow characteristics.

The foregoing process is used primarily in connection with finely divided solid matter, especially with masses of subdivided particles wherein the maximum particle size is usually below 200 microns average diameter. However, in certain types of contacting processes it is desirable to use coarser solids, for example, those having particle sizes which average more than 200 microns diameter, but these materials have substantially different flow characteristics and true fluidization is more difficult to achieve. It is nevertheless desirable to establish fluistatic heads of these coarser solids, or at least pseudo-fluistatic heads, to facilitate the transfer of these coarse solids from one region to another, so far as this is practicable. The present invention depends primarily upon the discovery that certain critical relationships exist between the flow of relatively coarse particulate solids and the streams of air or other gas which are used to "fluidize" them or make them flow somewhat in fluid fashion.

In particular, it has been discovered that when it is desired to flow a stream of coarse solids down a standpipe in which said pipe is filled to a substantial height, and into a riser from the bottom of the standpipe, a maximum flow rate can be obtained by aerating or partially fluidizing the descending column of solids at a velocity slightly below that required for true fluidization.

Thus, it has been discovered that by aerating the column of coarse solids, by introducing a stream of air or other fluidizing gas (or vapor) at a gas velocity in the range of about 0.1 to 0.3 feet per second below the minimum fluidization velocity, outstanding results may be achieved. The minimum fluidization velocity referred to means the gas velocity at which the pressure drop from bottom to top of a given column becomes equal to the weight of the bed of solids in said column.

With finely divided solids of the size range usually employed in fluidized beds (20 to 200 microns), the rising gas velocity which will just fluidize the solids mass incipiently is very low; typically it may be 0.02 ft./sec. For most purposes the solids flow velocity down a standpipe will be large compared with this. In a typical case this downflow velocity will be in the range 1 to 10 ft./sec. Since the solids velocity down is much more rapid than the upward velocity of gas relative to the solids, the finely divided solids will sweep the gas down with them. As the gas is swept down it is compressed by the fluistatic head of solids above. Since it is advantageous with these fine solids to maintain the same velocity of gas relative to solids to maintain fluidization, it is common practice to inject gas at various points down a standpipe to compensate for the gas compression.

With solids of larger particle size, e. g. above 300 microns and more particularly in the case of solids having an average particle size, for example, of about 400 microns or more, the requirements for successful operation have been found to be much different. The gas velocity relative to the solids is preferably kept below that required for fluidization. If the gas velocity reaches that required for fluidizing, "bubbles" form, and the flow of the solids becomes very rough and erratic. In addition, coarse solids are much more porous than fine solids are; consequently the gas is not swept down by the flowing solids, but rises against this flow. At the bottom of the standpipe the gases are at relatively high pressure.

As the gas ascends up the column of coarse solids the pressure on the gas becomes successively less and less and the velocity of the rising stream becomes greater and greater. As the stream flows further up the column a point is reached where the solids become fully fluidized. Above this point fluidization becomes more and more violent so that uniform flow of solids down the column becomes increasingly erratic.

According to this invention the usual fluidizing gas is introduced into the bottom of the "standpipe" or fluidizing column at a velocity slightly below that required for minimum fluidization at the bottom. As the stream rises and expands its velocity increases so that it becomes more than adequate in both volume and velocity to fluidize the upper part of the column of solids. Hence, beginning at least at intermediate points in the height of the column one or more bleeds or taps are provided and these are preferably spaced at intervals towards the top of the standpipe or column. By adjusting each of these bleeds or taps by suitable valves or equivalent controls the effective velocity of the rising gas stream may be closely controlled from point to point in the column. By this means optimum flow conditions for the solids may be maintained within the column or standpipe. The invention will be more particularly explained in connection with the accompanying drawing wherein Fig. 1 shows diagrammatically the lower part of a reaction vessel or the like from which a standpipe extends downwardly to connect with a riser through which relatively coarse solid particles are to flow;

Fig. 2 shows in a larger scale a portion of a standpipe such as that of Fig. 1 with a modified control system;

Fig. 3 shows a further embodiment of the invention applicable to a fluid or at least a flowing solids system comprising a reactor and a regenerator or the like.

In Fig. 1 a vessel 11 is indicated which may be either a reactor or a catalyst regenerator, shot heater or the like. In this vessel a mass of solid particles may be placed as indicated at 13. As a particular application this may be the reactor or the regenerator in a fluid coking system for hydrocarbon oils wherein the solid particles are granules of coke. However, the particles may be any type of inert or catalytic material such as beads, granules, shot and the like, preferably of average particle size around or above 400 microns or so. For purposes of illustration it is assumed that these particles, when their function in vessel 11 has been completed, are to flow down a standpipe 15 which is of conventional and well known type so far as its general structure is concerned. From standpipe 15 the particles, it is assumed, are desired to flow into a riser 17 from which they are returned upwardly to some other part of the system. They may be either fluidized (dense phase) or suspended (disperse phase) in the riser.

The junction between standpipe 15 and riser 17 may be somewhat angular as shown in Fig. 1 or it may be a U-bend if desired, as is well known in the art. In either case appropriate means are provided for injecting a gas or gasiform fluid such as air, steam, hydrocarbon vapor, etc. As indicated in Fig. 1, part of the gas may be introduced for the purpose of assisting in the flow of solids up the riser as indicated at 19 and another portion may be introduced at 21 through a suitable inlet line for aerating the column of solids in the standpipe 15. Appropriate valves or control means, not shown, are provided for the lines 19 and 21. Both of these lines enter the system somewhere at or near the bottom of the standpipe and/or riser.

As explained above, the gas injected at 21 will rise through the coarse solids in the standpipe, counter to the flow of the solids. Hence, the pressure at 21 must be relatively high. The maximum flow rate of gas fed at 21 should be limited to a rate just slightly below the minimum flow up the standpipe which is required to fluidize the particles at or just above the point where the fluidizing gas is introduced.

As this aerating gas rises in the column or standpipe 15 it flows around the coarse particles with which the column is substantially filled, especially at the bottom, and the pressure becomes less and less toward the top of standpipe 15. The gas stream therefore increases in velocity and if not otherwise controlled would cause such violent fluidization toward the top of the column that particles would not flow into the standpipe with any regularity and the operation would be most irregular and non-uniform. Hence, a series of taps or bleed lines, indicated at 23, 25, 27, 29, 31 and 33, are provided to take off the excess gas at intervals. The number and spacings of these bleed lines obviously will vary with the height of the standpipe 15 and the desired flow rate of solids, etc.

Each of the bleed lines is provided with a valve as indicated at 35, 37, 39, 41, 43, and 45. A pressure manometer preferably is provided opposite or just above each bleed line as indicated at 47, 49, 53, 55, 57 and 59 respectively. These manometers, which read the pressure drop across a short section of the standpipe above the bleed point, can be used as guides or controls in the setting of the valves 35, 37, etc. For maximum flow rate this pressure drop in each case should be slightly less than the bulk density of the solids. As noted above, such an adjustment indicates that the flow of gas is just below the minimum fluidizing velocity.

In Fig. 2 a short section of a standpipe 15a is indicated in a larger scale than in Fig. 1. From this standpipe 15a a bleed line 23a is taken off. The flow rate within the bleed line itself may be indicated by a manometer 61, a restriction orifice plate 63 being placed across the line 23a to indicate a pressure drop. A valve 35a is provided as in Fig. 1. A manometer 47a is connected to the main standpipe to function exactly as manometer 47 in Fig. 1. This may be used to indicate the pressure drop from point A to point B, it being understood that whereas the flow of solid particles is downwardly the aerating gases are flowing upwardly as indicated by the arrows and the gas pressure is less at B than at A. Automatic means, not shown, may be connected between the manometer 47a and the valve 35a to control the valve automatically in response to the pressure drop from A to B. Such control means are well known in the art and need not be described in detail.

In Fig. 3 there is shown a system which might be used for conversion of coal to liquid or gaseous products, for coking of petroleum residues, or for other analogous processes. In this system a reactor 111 is indicated from which a standpipe 115 descends in conventional fashion. Standpipe 115 connects with a riser 117 which leads to a regenerator 118. Instead of being a catalyst regenerator the latter may simply be a heater for inert particles or a reconditioner to clean up the solid particles, to remove deposits therefrom, or otherwise to change their condition.

From the regenerator vessel 118 the solids, which are preferably of about 300 microns average diameter or more, flow down a standpipe 120 and into a riser 122.

An aerating gas may be introduced into standpipe 115 through a line 130 near the bottom of the standpipe. A fluidizing or carrying gas for the stream of solids which are to flow up the riser 117 may be introduced at 132 and at additional points if desired.

Since the solids which are to flow down standpipe 115 should preferably flow at a controlled rate it is necessary to provide control means for maintaining appropriate flow conditions. As explained above, the pressure at the bottom of the standpipe tends to be high and the gas velocity low. Gas velocity increases up the column and becomes excessively high near the top unless corrective measures are taken. Here, as in Fig. 1, bleeds or taps may be provided as indicated at 143 and 145, only two being shown for simplicity. Actually, as previously suggested, the number of bleed lines will vary with the height and size of the standpipe, the granular size of the solids being handled, their density, surface characteristics and other factors. The important point is that the fluidizing gas introduced at 130 becomes excessively voluminous as it rises up the standpipe under rapidly diminishing pressure conditions. Hence, its velocity increases to a considerable degree. The bleeds or tap lines 143, 145, etc., are provided with suitable valves, not shown, to maintain close control of gas velocity below minimum fluidizing velocity for the particular types of solids involved. Consequently, control of the solids flow down the standpipe is achieved. For maximum flow, the aerating gas supply is just barely below the minimum required for fluidization. Otherwise less gas may be used.

With coarse solids, using the system of this invention, the pressure gradient in the standpipe and the solids flow rate up the riser, are related. If the solids flow rate up the riser is low, the pressure drop per unit length in the standpipe will be low. Correspondingly, the gas velocity up the standpipe which gives rise to the low $\Delta p/\Delta l$ will be low, that is, gas velocity in standpipe equals $k \times \Delta p/\Delta l$. The maximum allowable $\Delta p/\Delta l$ will be that which is equal to the bulk density of the solids. At that point the standpipe solids become fluidized, and flow is erratic. To avoid erratic flow the gas velocity should be limited so that $\Delta p/\Delta l$ does not quite reach the solids bulk density. This limitation applies only when maximum solids flow is required. If the solids flow is less than this, the $\Delta p/\Delta l$ in the standpipe will automatically be in a safe region.

It will be understood from the above that in the handling of coarse solids it is particularly undesirable for the gas velocity to be at or above the minimum fluidizing point. The resultant turbulence and bubble formation toward the top of the column results in very erratic flow and even bridging of the standpipe. Since the coarse solids do not sweep the gas stream along with them to the same extent that finely divided solids do, the known conditions of operating a fine solids system are largely inapplicable to systems using the solids of around 300 to 400 microns average diameter or larger.

It will be understood that the subject invention can

What is claimed is:

1. The process of controlling the flow of a mass of coarse solid particles down a standpipe and into an aerated solids riser, which comprises introducing a gasiform fluid near the bottom of a standpipe at a rate such as to aerate but not quite fluidize the solids in the lower part of said standpipe where pressure of solids in said standpipe is substantial, and bleeding off successive portions of said aerating fluid at a series of spaced points up said standpipe, to hold more nearly constant the velocity of the fluid up said standpipe as the pressure thereon is successively reduced.

2. The process of controlling the flow of a mass of coarse solids down a column and up a riser, which comprises introducing an aerating gas near the bottom of said column at such pressure and velocity as to flow up said column at 0.1 to 0.3 feet per second less than minimum fluidizing velocity for said solids and bleeding off a portion of the ascending gas as it rises and expands to hold its upflowing velocity below said minimum fluidizing velocity throughout its ascent.

3. Process according to claim 2 which comprises successively tapping off a plurality of portions of said upflowing gas under control of its successive drops in pressure in said column to keep its flow velocity slightly below said fluidizing velocity all the way up said column.

4. A process according to claim 2 wherein the bled gas is led into a riser to assist in lifting a stream of subdivided particles flowing therein.

5. In a process for transferring coarse solid particles from one zone to another zone wherein a column of solid particles is maintained in an aerated condition to build up pressure on the solids and wherein fluidizing gas introduced into the lower part of said column flows upwardly countercurrent to the coarse solids and tends to over-fluidize the coarse solids by expansion of the gas at the lower pressures existing in the upper portions of said column, the improvement which comprises introducing a gas at slightly below a velocity required for true fluidization of the coarse solids at the lower portion of said column of coarse solids of at least 300 microns in average size where pressure produced by the coarse solids in said column is substantial, and bleeding off successive portions of the fluidizing gas at a series of spaced points along said column to hold the velocity of the upflowing gas substantially constant in said column as the pressure on the fluidizing gas is reduced during its upward travel.

6. In a process for transferring coarse solid particles from one zone to another zone wherein a column of solid particles is maintained in an aerated condition to build up pressure on the solids and wherein fluidizing gas introduced into the lower part of said column flows upwardly countercurrent to the coarse solids and tends to over-fluidize the coarse solids by expansion of the gas at the lower pressures existing in the upper portions of said column, the improvement which comprises introducing a gas at a velocity of about 0.1 to 0.3 feet per second less than minimum fluidizing velocity for the coarse solids into the lower portion of said column of coarse solids of at least 300 microns in average size where pressure produced by the coarse solids in said column is substantial and bleeding off portions of the ascending fluidizing gas as it rises in said column and expands to hold its upflowing velocity below said minimum fluidizing velocity throughout substantially its entire ascent in said column.

References Cited in the file of this patent

UNITED STATES PATENTS

| | | |
|---|---|---|
| 1,032,115 | Cook | July 9, 1912 |
| 1,597,438 | Ennis | Aug. 24, 1926 |
| 1,616,547 | Pontoppidan | Feb. 8, 1927 |
| 2,304,827 | Jewell | Dec. 15, 1942 |
| 2,458,434 | Simpson | Jan. 4, 1949 |
| 2,636,642 | Gorin | Apr. 28, 1953 |
| 2,676,142 | Crowley | Apr. 20, 1954 |
| 2,684,931 | Berg | July 27, 1954 |
| 2,699,970 | Closs | Jan. 18, 1955 |